United States Patent [19]

Mafoti

[11] Patent Number: 5,125,974
[45] Date of Patent: Jun. 30, 1992

[54] INTERNAL MOLD RELEASE AGENTS AND THE USE THEREOF IN THE PRODUCTION OF MOLDED PRODUCTS

[75] Inventor: Robson Mafoti, Pittsburgh, Pa.

[73] Assignee: Miles Inc., Pittsburgh, Pa.

[21] Appl. No.: 689,203

[22] Filed: Apr. 22, 1991

[51] Int. Cl.$^5$ .......................... B29B 1/24; B29B 7/38; B29K 75/00; C08L 75/00

[52] U.S. Cl. ........................... 106/243; 106/287.24; 106/287.25; 106/287; 106/26; 252/182.13; 252/182.24; 252/182.28; 264/51; 264/328.1; 264/328.6; 264/328.8; 521/113; 521/163; 521/170; 521/172; 524/724; 524/728; 528/52; 528/68; 528/76; 528/80; 528/85

[58] Field of Search ............. 106/243, 287.24, 287.25, 106/287.26; 252/182.13, 182.24, 182.28; 264/51, 328.1, 328.6, 328.8; 521/113, 163, 170, 172; 524/724, 728; 528/52, 68, 76, 80, 85

[56] References Cited

U.S. PATENT DOCUMENTS

| | | | |
|---|---|---|---|
| 3,726,952 | 4/1973 | Boden et al. | 521/128 |
| 3,925,527 | 12/1975 | Kleimann et al. | 264/53 |
| 4,111,861 | 9/1978 | Godlewski | 521/123 |
| 4,201,847 | 5/1980 | Kleimann et al. | 521/172 |
| 4,220,727 | 9/1980 | Godlewski | 521/128 |
| 4,254,228 | 3/1981 | Kleimann et al. | 521/128 |
| 4,420,570 | 12/1983 | Dominguez | 264/328.6 |
| 4,519,965 | 5/1985 | Taylor et al. | 264/328.8 |
| 4,546,154 | 10/1985 | Robertson | 264/51 |
| 4,581,386 | 4/1986 | Taylor et al. | 264/51 |
| 4,585,803 | 4/1986 | Nelson et al. | 264/328.6 |
| 4,585,829 | 4/1986 | Kuo et al. | 264/51 |
| 4,758,603 | 7/1988 | Carswell | 264/51 |
| 4,764,537 | 8/1988 | Horn et al. | 521/128 |
| 4,789,688 | 12/1988 | Dewhurst et al. | 521/128 |
| 4,847,307 | 7/1989 | Dewhurst et al. | 521/128 |
| 4,857,561 | 8/1989 | Mafoti et al. | 528/60 |
| 4,868,224 | 9/1989 | Harasin et al. | 264/51 |
| 4,886,838 | 12/1989 | Dewhurst | 521/129 |
| 4,897,428 | 1/1990 | Dewhurst et al. | 264/328.6 |
| 4,946,922 | 8/1990 | Reisch et al. | 264/328.6 |
| 4,954,537 | 9/1990 | Sanns, Jr. | 264/328.8 |
| 5,002,999 | 3/1991 | Lowery et al. | 264/328.6 |
| 5,011,647 | 4/1991 | Meyer et al. | 264/328.6 |
| 5,019,317 | 5/1991 | Slocum et al. | 264/328.6 |
| 5,076,989 | 12/1991 | Dewhurst | 264/328.6 |

Primary Examiner—Maurice J. Welsh
Assistant Examiner—Rabon Sergent
Attorney, Agent, or Firm—Joseph C. Gil

[57] ABSTRACT

The present invention is directed to a novel internal release agent for the production of polyurethane and/or polyurea elastomers, to an isocyanate reactive composition containing that release agent and to the use of the release agent in a RIM process. The release agent is the reaction product of i) a transester of a) a polyester derived from a polymerized fatty acid and either neopentyl glycol or 2,2,4-trimethyl-1,3-pentane diol and b) an acetoacetate and ii) an aliphatic monoisocyanate.

7 Claims, No Drawings

INTERNAL MOLD RELEASE AGENTS AND THE USE THEREOF IN THE PRODUCTION OF MOLDED PRODUCTS

BACKGROUND OF THE INVENTION

Internal mold release agents used in the production of molded polyurethane and polyurea products are known. U.S. Pat. Nos. 4,201,847 and 4,254,228 describe an internal mold release which is the reaction product of an organic polyisocyanate and an active hydrogen containing fatty acid ester.

U.S. Pat. No. 3,925,527 describes an internal mold release which is the reaction product of a fatty acid ester and an organic monoisocyanate.

While these types of internal release agents have met with some success, neither is totally satisfactory for many applications. Two shortcomings of all internal release agents to date, including those described above, are i) the inability to release from a bare metal mold, such as steel or aluminum, and ii) the incompatibility of such agents with other additives typically used in the reaction injection molding ("RIM") process.

DESCRIPTION OF THE INVENTION

The present invention is directed to a novel internal mold release agent comprising the reaction product of
a) the transesterificatin product of
   1) a polyester (i) having an OH number of from about 50 to about 550, preferably from about 50 to about 300, and most preferably from about 100 to about 200, (ii) having an acid number of 10 or less, preferably 2 or less, and most preferably less than 1, and (iii) prepared by reacting a polymerized fatty acid with a diol selected from the group consisting of neopentyl glycol and 2,2,4-trimethyl-1,3-pentane diol, and
   2) a lower alkyl acetoacetate, preferably in a ratio of one mole of acetoacetate per hydroxyl group of the polyester, and
b) an aliphatic monoisocyanate at an isocyanate to acetoacetate group equivalent ratio of from 1:1 to 1:10.

It has been found that this particular combination of materials gives excellent release from a variety of different mold surfaces. Excellent release occurs when the mold surface has been pre-sprayed with an external release agent. It has also been found that release from a bare metal mold, such as steel or aluminum, is possible without any pre-application of external mold release agent to the mold surface. Finally, the release agents herein are compatible with active hydrogen containing mixtures which are typically used in the preparation of reaction injection molded ("RIM") parts.

The polyesters useful herein (i) have OH number of from about 50 to about 550, preferably from about 50 to about 300, and most preferably from about 100 to about 200, (ii) have acid number so f10 or less, preferably 2 or less, and most preferably less than 1, and (iii) are prepared by reacting a polymerized fatty acid with a specific diol.

Polymerized fatty acids are known in the art. See, e.g., U.S. Pat. Nos. 4,602,079, 4,680,379, 4,853,430 and 4,937,320, the disclosures of which are herein incorporated by reference. As used herein, and as used int eh art, the term "polymerized fatty acids" is intended to mean those chosen from the group consisting of the dimers and trimers o unsaturated aliphatic monoacids containing from 8 to 24 carbon atoms, and mixtures thereof. Specific polymerized fatty acids useful herein are commercially available from Unichema International under the trademark "Pripol" and from Henkel under the trademark "Empoly". Specific polymerized fatty acids include Pripol 1008, Pripol 1009, Pripol 1004, Empol 1009, Empol 1010, and Empol 1014.

The polyesters used are prepared by esterifying a polymerized carboxylic acid with neopentyl glycol or 2,2,4-trimethyl-1,3-pentanediol.

Preparation of the polyester is most suitably carried out by the condensation of the diol and acid at temperatures above 100° C., preferably at 120° C. to 220° C., optionally in a vacuum, the process of the elimination of water being continued until the desired hydroxyl and acid numbers have been obtained. The process of esterification may, of course, be catalyzed with acid or basic catalysts and the water may be eliminated by azeotropic distillation. When using neopentyl glycol, in some instances, it is desirable to add a small amount of propylene glycol in order to help reflux the neopentyl glycol. When used, the propylene glycol is used in an amount of from 5 to 10% by weight based on the total weight of the reactants. The coesters prepared and used according to the invention contain predominant amounts of hydroxyl groups and may contain small amounts of carboxylic acid groups.

General techniques for the preparation of the polyesters of the type useful herein are generally known and are described in U.S. Pat. Nos. 4,201,847, 4,254,228, and 3,925,527, the disclosures of which are herein incorporated by reference.

The fatty acid ester is then transesterified with a lower alkyl acetoacetate. In generally, the transesterification reaction is conducted at temperatures ranging from 160° to 210° C. for periods of time ranging from 2 to 8 hours. If desired, transesterification catalysts, such as dibutyltin oxide and tetrabutyl titanate, can be used. By "lower alkyl" is meant alkyl groups containing from one to five carbon atoms. Specific useful acetoacetates include methyl acetoacetate, ethyl acetoacetate, t-butyl acetoacetate, propyl acetoacetate and the like, with t-butyl acetoacetate being the presently preferred material. In preparing the transesterified product herein, transesterification catalysts may be necessary. In preparing the product, it is generally preferred that the reactants be used in amount such that one OH group is present for each acetoacetate group. However, it is also possible to use excess amounts of either reactant. In fact, in some cases it is preferred to use an excess of the acetoacetate to ensure complete reaction.

The resultant product is then reacted with a monoisocyanate. Any suitable aliphatic monoisocyanate containing five or more carbon atoms exclusive of the isocyanate group may be used to prepare the internal mold release agents herein. Organic monoisocyanates which contain more than 5 and up to twenty carbon atoms in the molecule are preferred. Specific isocyanates useful herein include octadecyl isocyanate, tetradecyl isocyanate, hexadecyl isocyanate, cyclohexyl isocyanate, isopentyl isocyanate, isononyl isocyanate, monoisocyanates derived from amines which can be obtained synthetically from resinic acids or fatty acids, for example, dihydroabietyl isocyanate, oleyl or stearyl isocyanate. Octadecyl isocyanate is the presently preferred isocyanate.

Reaction of the transesterified product with the monoisocyanate is generally carried out by mixing the product with the monoisocyanate and reacting the components at temperatures between 30° C. and 200° C., preferably between 45° C. and 110° C., optionally with stirring. Lower reaction temperatures could also in principle be used but the length of time which would then be required for complete reaction of the components to obtain suitable reaction products for the process would be uneconomical.

The equivalent ratio of acetoacetate groups to isocyanate groups in the reaction is generally maintained between 10:1 and 1:1.

The release agents of the present invention are eminently suitable for use in the RIM process. As is known, in the RIM process, an isocyanate, and active hydrogen containing compounds are mixed and injected into molds, where the reactant are allowed to react fully.

Starting polyisocyanate components suitable for use in the RIM process include aliphatic, cycloaliphatic, araliphatic, aromatic and heterocyclic polyisocyanates of the type described, for example, by W. Siefken in Justus Liebigs Annalen der Chemie, 562, pages 72 to 136. Specific examples of useful isocyanates include ethylene diisocyanate; 1,4-tetramethylene diisocyanate; 1,6-hexamethylene diisocyanate; 1,12-dodecane diisocyanate; cyclobutane-1,3-diisocyanate; cyclohexane-1,3- and -1,4-diisocyanate and mixtures of these isomers. Additional examples are 1-isocyanato-3,3,5-trimethyl-5-isocyanatomethyl cyclohexane (German Auslegeschrift 1,202,785, U.S. Pat. No. 3,401,190), 2,4- and 2,6-hexahydrotolylene diisocyanate and mixtures of these isomers. Hexahydro-1,3- and/or -1,4-phenylene diisocyanate; perhydro-2,4'-and/or -4,4'-diphenylmethane diisocyanate; 1,3- and 1,4-phenylene diisocyanate; 1,4- and 2,6-tolylene diisocyanate and mixtures of these isomers are also suitable in the instant invention. Diphenylmethane-2,4- and/or -4,4'-diisocyanate; naphthylene-1,5-diisocyanate; triphenylmethane-4,4', 4"-triisocyanate; polyphenyl polymethylene polyisocyanates of the type obtained by condensing aniline with formaldehyde, followed by phosgenation and described, for example, in British Patents 874,430 and 848,671 may also be used in the present invention; m- and p-isocyanato-phenylsulfonyl isocyanates as described in U.S. Pat. No. 3,454,606; perchlorinated aryl polyisocyanates of the type described, for example, in German Auslegeschrift 1,157,601 (U.S. Pat. No. 3,277,138); polyisocyanates containing carbodiimide groups of the type described in German Patent 1,902,007 (U.S. Pat. No. 3,152,162); diisocyanates of the type described in U.S. Pat. No. 3,492,330; and polyisocyanates containing allophanate groups of the type described, for example, in British Patent 993,890, in Belgian Patent 761,626 and in published Dutch Patent Application 7,102,524 are still further examples of suitable isocyanates. Additionally, polyisocyanates containing isocyanurate groups of the type described, of example, in U.S. Pat. No. 3,001,973; in German Patents 1,022,789; 1,222,067 and 1,027,394 and in German Offenlegungsschriften 1,929,034 and 2,004,408; polyisocyanates containing urethane groups of the type described, for example, in Belgian Patent 752,261 or in U.S. Pat. No. 3,394,164; polyisocyanates containing acylated urea groups according to German Patent 1,230,778 and polyisocyanates containing biuret groups of the type described, for example, in German Patent 1,101,394 (U.S. Pat. Nos. 3,124,605 and 3,201,372) and in British Patent 889,050 are also suitable.

Polyisocyanates produced by telomerization reactions of the type described, for example, in U.S. Pat. No. 3,654,106; polyisocyanates containing ester groups of the type described for example, in British Patents 965,474 and 1,072,956, in U.S. Pat. No. 3,567,763 and in German Patent 1,231,688; reaction products of the above-mentioned isocyanates with acetals according to german Patent 1,072,385 and polyisocyanates containing polymeric fatty acid residues, according to U.S. Pat. No. 3,455,883 are still further examples of suitable isocyanates.

Aromatic polyisocyanates which are liquid at the processing temperature are preferably used. The particularly preferred starting polyisocyanates include derivatives of 4,4'-diisocyanato-diphenylmethane which are liquid at room temperature, for example, liquid polyisocyanates containing urethane groups of the type obtainable in accordance with German Patent 1,618,380 (U.S. Pat. No. 3,644,457). These may be produced for example, by reacting 1 mol 4,4'-diisocyanatodiphenylmethane with from 0.05 to 0.3 mols of low molecular weight diols or triols, preferably polypropylene glycols having a molecular weight below 700. Also useful are diisocyanates based on diphenylmethane diisocyanate containing carbodiimide and/or uretone imine groups of the type obtainable, for example, in accordance with German Patent 1,092,007 (U.S. Pat. No. 3,152,162). Mixtures of these preferred polyisocyanates can also be used. In general, aliphatic and cycloaliphatic isocyanates are less suitable for the purposes of the instant invention.

Also preferred are the polyphenyl-polymethylene polyisocyanates obtained by the phosgenation of an aniline/formaldehyde condensate.

Also necessary for preparing molded products via the RIM process are isocyanate reactive components. These components may be typically divided into two groups, high molecular wight compounds having a molecular weight of 400 to about 10,000 and low molecular weight compounds, i.e. chain extenders, having a molecular weight of 62 to 399. Examples of suitable high molecular weight compounds include the polyesters, polyethers, polythioethers, polyacetals and polycarbonates containing at least 2, preferably 2 to 8 and most preferably 2 to 4 isocyanate-reactive groups of the type known for the production of polyurethanes.

The high molecular weight polyethers suitable for use in accordance with the invention are known and may be obtained, for example, by polymerizing epoxides such as ethylene oxide, propylene oxide, butylene oxide, tetrahydrofuran, styrene oxide or epichlorohydrin in the presence of $BF_3$ or by chemically adding these epoxides, preferably ethylene oxide and propylene oxide, in admixture or successively to components containing reactive hydrogen atoms such as water, alcohols or amines. Examples of alcohols and amines include the low molecular weight chain extenders set forth hereinafter, 4,4'-dihydroxy diphenyl propane, sucrose, aniline, ammonia, ethanolamine and ethylene diamine. It is preferred to use polyethers which contain substantial amount of primary hydroxyl groups in terminal positions (up to 90% by weight, based on all of the terminal hydroxyl groups present in the polyether). Polyethers modified by vinyl polymers, of the type formed, for example, by polymerizing styrene or acrylonitrile in the presence of polyether (U.S. Pat. Nos. 3,383,351;

3,304,273; 3,523,093; and 3,110,695; and German Patent 1,152,536), are also suitable, as are polybutadienes containing OH groups.

In addition, polyether polyols which contain high molecular wight polyadducts or polycondensates in finely dispersed form or in solution may be used. Such modified polyether polyols are obtained when polyaddition reactions (e.g., reactions between polyisocyantes and amino functional compounds) or polycondensation reactions (e.g., between formaldehyde and phenols and/or amines) are directly carried out in situ in the polyether polyols.

Suitable examples of high molecular weight polyesters include the reaction products of polyhydric, preferably dihydric alcohols (optionally in the presence of trihydric alcohols), with polyvalent, preferably divalent, carboxylic acids. Instead of using the free carboxylic acids, it is also possible to sue the corresponding polycarboxylic acid anhydrides or corresponding polycarboxylic acid esters of lower alcohols or mixtures thereof for producing the polyesters. The polycarboxylic acids may be aliphatic, cycloaliphatic, aromatic, and/or heterocyclic and may be unsaturated or substituted, for example, by halogen atoms. The polycarboxylic acids and polyols used to prepare the polyesters are known and described for example in U.S. Pat. Nos. 4,098,731 and 3,726,952, herein incorporated by reference in their entirety. Suitable polythioethers, polyacetals, polycarbonates and other polyhydroxyl compounds are also disclosed in the aboveidentified U.S. Patents. Finally, representatives of the many and varied compounds which may be used in accordance with the invention may be found for example in High Polymers, Volume XVI, "Polyurethanes, Chemistry and Technology, " by Saunders-Frisch, Interscience Publishers, New York, London, Vol. ·I, 1962, pages 32-42 and 44-54, and Volume II, 1964, pages 5-6 and 198-199; and in Kunstsoff-Handuch, Vol. VII, Vieweg-Hochtlen, Carl Hanser Verlag, Munich, 1966, pages 45-71.

Suitable aminopolyethers which may be used in accordance with the present invention as high molecular weight compounds (the molecular weight is always the average molecular weight which may be calculated from the functionality and the content of isocyanate-reactive groups) are those wherein at least about 30 and preferably about 60 to 100 equivalent % of the isocyanate-reactive groups are primary and/or secondary (preferably primary) aromatically or aliphatically (preferably aromatically)bound amino groups and the remainder are primary and/or secondary aliphatically bound hydroxyl groups.

In these compounds, the terminal residues carrying the amino groups may also be attached to the polyether chain by urethane or ester groups. These "aminopolyethers" are prepared by method known per se. For example, polyhydroxypolyethers such as polypropylene glycol ethers may be aminated by reaction with ammonia in the presence of Raney nickel and hydrogen (Belgian Patent 634,741). U.S. Pat. No. 3,654,370 describes the production of polyoxyalkylene polyamines by reaction of the corresponding polyol with ammonia and hydrogen in the presence of a nickel, copper, chromium catalyst. German Patent 1,193,671 describes the production of polyethers containing terminal amino groups by hydrogenation of cyanoethylated polyoxypropylene ethers. Other methods for the production of polyoxyalkylene (polyether) amines are described in U.S. Pat. Nos. 3,155,728 and 3,236,895 and French Patent 1,551,605. The production of polyethers containing terminal secondary amino groups is described, for example, in French Patent 1,466,708.

Polyhydroxypolyethers of relatively high molecular weight may be converted into the corresponding anthranilic acid esters by reaction with isatoic acid anhydride, as described, for example, in German Offenlegungsschriften 2,019,432 and 2,619,840 and in U.S. Pat. Nos. 3,808,250, 3,975,428 and 4,016,143. Polyethers containing terminal aromatic amino groups are formed in this way.

According to German Offenlegungsschrift 2,546,536 and U.S. Pat. No. 3,865,791, relatively high molecular weight compounds containing terminal amino groups are obtained by reaction of NCO prepolymers based on polyhydroxypolyethers with enamines, aldimines or ketimines containing hydroxyl groups and subsequent hydrolysis.

It is preferred to sue amino polyethers obtained by hydrolysis of compounds containing terminal isocyanate groups, for example in accordance with German Offenlegungsschrift 2,948,419 or U.S. Pat. No. 4,515,923, herein incorporated by reference in its entirety. In this process, polyethers most preferably containing 2 to 4 hydroxyl groups are reacted with polyisocyanates to form NCO prepolymers and, in a second step, the isocyanate groups are converted by hydrolysis into amino groups.

Also useful are amino compounds prepared by reacting the corresponding polyol with a halogenated nitrobenzene compound such as o- or p-nitrochlorobenzene, followed by the reduction of the nitro group(s) to the amine as described in U.S. application Ser. No. 183,556, filed on Apr. 19, 1988, and in published European Application 0268849, published Jun. 1, 1988.

The "aminopolyethers" used in accordance with the invention are often mixtures of the compounds mentioned by way of example and (on a statistical average) most preferably contain 2 to 4 terminal isocyanate-reactive groups. In the process according to the invention, the "aminopolyethers" may be used in admixture with polyhydroxypolyethers free from amino groups.

In accordance with the present invention, the high molecular weight compounds can be used in admixture with up to about 95% by weight based on the total quantity of active hydrogen containing compounds, of low molecular weight chain extenders. Examples of suitable hydroxyl group-containing chain extenders include ethylene glycol, 1,2- and 1,3-propane diol, 1,3- and 1,4- and 2,3-butane diol, 1,6-hexane diol, 1,10-decane diol, diethylene glycol, triethylene glycol, tetraethylene glycol, dipropylene glycol, tripropylene glycol, glycerol and trimethylol propane.

Other suitable chain extenders include aromatic polyamines, preferably diamines, having molecular weights of less than 400, especially the sterically hindered aromatic polyamines, preferably diamines, having molecular weights of less than 400, especially the sterically hindered aromatic diamines which contain at least one linear or branched alkyl substituent in the ortho-position to the first amino group and at least one, preferably two linear or branched alkyl substituents containing from 1 to 4, preferably 1 to 3, carbon atoms in the ortho-position to a second amino group. These aromatic diamines include 1-methyl-3,5-diethyl2,4-diamino benzene, 1-methyl-3,5-diethyl-2,6-diamino benzene, 1,3,5-trimethyl2,4-diamino benzene, 1,3,5-triethyl-2,4-diamino benzene, 3,5,3',5'-tetraethyl-4,4'-diamino diphenylmethane, 3,5,3', 5'-tetraisopropyl-4,4'-diamino diphenylmethane, 3,5-diethyl-3', 5'-diisopropyl-4,4'-diamino diphenylmethane, 3,5-diethyl-5,5'-diisopropyl-4,4'-diamino diphenylmethane, 1-methyl-2,6-diamino-3-isopropylbenzene and mixtures of the above diamines. Most preferred are mixtures of 1-methyl-3,5-diethyl-2,4-diamino benzene and 1-methyl-3,5-diethyl-2,6-diamino benzene in a weight ratio between about 50:50 to 85:15, preferably about 65:35 to 80:20.

In addition, aromatic polyamines may be used in admixture with the sterically hindered chain extenders and include, for example, 2,4- and 2,6-diamino toluene, 2,4'-and/or 4,4'-diaminodiphenylmethane, 1,2- and 1,4-phenylene diamine, naphthalene-1,5-diamine and triphenylmethane4,4', 4"-triamine. The difunctional and polyfunctional aromatic amine compounds may also exclusively or partly contain secondary amino groups such as 4,4'-di-(methylamino)diphenylmethane or 1-methyl-2-methylamino-4-amino-benzene. Liquid mixtures of polyphenyl polymethylene-polyamines, of the type obtained by condensing aniline with formaldehyde, are also suitable. Generally, the nonsterically hindered aromatic diamines and polyamines are too reactive to provide sufficient processing time in a RIM system. Accordingly, these diamines and polyamines should generally be used in combination with one or more of the previously mentioned sterically hindered diamines or hydroxyl group-containing chain extenders.

Other additives which may be used in the RIM process according to the present invention include catalysts, especially tin (II) salts of carboxylic acids, dialkyl tin salts of carboxylic acids, dialkyl tin mercaptides, dialkyl tin dithioesters and tertiary amines. Preferred among these catalysts are dibutyl tin dilaurate and 1,4-diazabicyclo(2,2,2)-octane (triethylene diamine), especially mixtures of these catalysts. The catalysts are generally used in amounts of about 0.01 to 10%, preferably about 0.05 to 2%, based on the weight of the isocyanate reactive component.

It is also possible to use surface-active additives such as emulsifiers and foam stabilizers. Examples include N-stearyl-N'-N'-bis-hydroxyethyl urea, oleyl polyoxyethylene amine, stearyl diethanol amide, isostearyl diethanolamide, polyoxyethylene glycol monoleate, a pentaerythritol/adipic acid/oleic acid ester, a hydroxy ethyl imidazole derivative of oleic acid, N-stearyl propylene diamine and the sodium salts of castor oil sulfonates or of fatty acids. Alkali metal or ammonium salts of sulfonic acid such as dodecyl benzene sulfonic acid or dinaphthyl methane sulfonic acid and also fatty acids may also be used as surface-active additives.

Suitable foam stabilizers include water-soluble polyether siloxanes. The structure of these compounds is generally such that a copolymer of ethylene oxide and propylene oxide is attached to a polydimethyl siloxane radical. Such foam stabilizers are described in U.S. Pat. No. 2,764,565. In addition to the catalysts and surface-active agents, other additives which may be used in the molding compositions of the present invention include known blowing agents, cell regulators, flame retarding agents, plasticizers, dyes, fillers and reinforcing agents such as glass in the form of fibers or flakes or carbon fibers.

The molded products of the present invention are prepared by reacting the components in a closed mold. The compositions according to the present invention may be molded using conventional processing techniques at isocyanate indexes ranging from as low as 90 to as high as 400 (preferably from 95 to 115) and are especially suited for processing by the RIM process. In general, two separate streams are intimately mixed and subsequently injected into a suitable mold, although it is possible to use more than two streams. The first stream contains the polyisocyanate component, while the second stream contains the isocyanate reactive components and any other additive which is to be included. According to the present invention, the internal release agent is added to the isocyanate reactive components, generally in an amount of from 2 to 20% by weight, and preferably from 3 to 10% by weight, based on the total weight of the isocyanate reactive components.

The invention is further illustrated but is not intended to be limited by the following examples in which all parts and percentages are by weight unless otherwise specified.

EXAMPLES

POLYESTER A: A twelve liter flask was charged with 1558 parts of neopentyl glycol. 156 parts of propylene glycol (approximately 10% by weight of the total neopentyl glycol) was added to help reflux the neopentyl glycol that would otherwise be lost due to sublimation. Nitrogen was bubbled through the flask and the temperature of the flask was raised to 160° C. 4322 parts of dimer acid (Pripol 1009 from Unichema) were slowly added with stirring and the temperature was raised to 220° C. at the completion of the addition. Water was collected in the receiving flask. After the atmospheric cycle, vacuum was slowly applied to the system and more water was distilled over (a total of 270 parts of water were collected). Full vacuum was then applied and 156 parts of propylene glycol were distilled over. The polyester gave by titration, the following: acid number - about 0.8, and OH number - about 135.

TRANSESTER A: A twelve liter flask was charged with 5610 parts of POLYESTER A. 0.2 parts of dibutyltin oxide catalyst was mixed with 1566 parts of methyl acetoacetate, and this mixture was slowly added to the polyester which was held at a temperature of 160° C. Methanol (432 parts) was collected in the receiving flask the reaction was monitored by IR. The complete disappearance of the OH peaks by IR characterization indicated the end of the reaction.

IMR 1: A twelve liter flask was charged with 3975 parts of octadecyl isocyanate and 6744 parts of TRANSESTER A. 0.5 parts of dibutyltin dilaurate were added. The temperature was kept at 100° C. and the reaction sequence was monitored by IR. The final product showed a complete disappearance of both the NCO and the OH peaks by IR characterization.

POLYESTER B: A twelve liter flask was charged with 2188 parts of 2,2,4-trimethyl-1,3-pentane diol. Nitrogen was bubbled through the flask and the temperature of the flask was raised to 160° C. 4322 parts of dimer acid (Pripol 1009 from Unichema) were slowly added with stirring and the temperature was raised to 220° C. at the completion of the addition. Water was collected in the receiving flask. After the atmospheric cycle, vacuum was slowly applied to the system and more water was distilled over (a total of 268 parts of water were collected). The polyester gave by titration, the following: acid number - about 0.9, and OH number - about 134.

TRANSESTER B: A twelve liter flask was charged with 5610 parts of POLYESTER B. 0.2 parts of dibutyltin oxide catalyst was mixed with 1566 parts of methyl acetoacetate, and this mixture was slowly added to the polyester which was held at a temperature of 160° C. Methanol (432 parts) was collected in the receiving flask the reaction was monitored by IR. The complete disappearance of the OH peaks by IR characterization indicated the end of the reaction.

IMR 2: A twelve liter flask was charged with 3975 parts of octadecyl isocyanate and 6744 parts of TRANSESTER B. 0.5 parts of dibutyltin dilaurate were added. The temperature was kept at 100° C. and the reaction sequence was monitored by IR. The final product showed a complete disappearance of both the NCO and the OH peaks by IR characterization.

POLYESTER C (comparative): A twelve liter flask was charged with 3671 parts of neopentyl glycol. 360 parts of propylene glycol (approximately 10% by weight of the total neopentyl glycol) was added to help reflux the neopentyl glycol that would otherwise be lost due to sublimation. Nitrogen was bubbled through the flask and the temperature of the flask was raised to 160° C. 2575 parts of adipic acid were slowly added with stirring and the temperature was raised to 220° C. at the completion of the addition. Water was collected in the receiving flask. After the atmospheric cycle, vacuum was slowly applied to the system and more water was distilled over (a total of 636 parts of water were collected). Full vacuum was then applied and 360 parts of propylene glycol were distilled over. The polyester gave by titration, the following: acid number - about 0.7, and OH number - about 135.

TRANSESTER C (comparative): A twelve liter flask was charged with 5610 parts of POLYESTER C. 0.2 parts of dibutyltin oxide catalyst was mixed with 1566 parts of methyl acetoacetate, and this mixture was slowly added to the polyester which was held at a temperature of 160° C. Methanol (432 parts) was collected in the receiving flask the reaction was monitored by IR. The complete disappearance of the OH peaks by IR characterization indicated the end of the reaction.

IMR 3 (comparative): A twelve liter flask was charged with 3975 parts of octadecyl isocyanate and 6744 parts of TRANSESTER C. 0.5 parts of dibutyltin dilaurate were added. The temperature was kept at 100° C. and the reaction sequence was monitored by IR. The final product showed a complete disappearance of both the NCO and the OH peaks by IR characterization.

In the examples which follow, the following materials were used:

POLYAMINE A: an amine terminated polyether having an amine number of about 30 and prepared hydrolyzing an isocyanate terminated prepolymer which had been prepared by reacting toluene diisocyanate with a 4800 molecular weight glycerin/propylene oxide/ethylene oxide polyether (PR:EO ratio was about 5:1; the polyether had an OH number of 35 and had primary OH termination);

POLYAMINE B: a 1:1 mixture of a 3000 molecular weight propylene oxide triamine and a 2000 molecular weight propylene oxide diamine, both available from Texaco;

DETDA: an 80:20 mixture of 1-methyl-3,5-diethyl-2,4- and -2,6-phenylene diamine;

POLYOL A: a reaction product of ethylene diamine and propylene oxide having an OH number of about 630;

L-5304: a silicone surfactant available from Union Carbide;

ISO: an isocyanate having an NCO content of about 22% and prepared by i) reacting 252 parts of 4,4'-methylenebis(phenyl isocyanate), 27 parts of a carbodiimide-group modified 4,4'-methylenebis(phenyl isocyanate) having an NCO content of about 29%, and 169 parts of a 2000 molecular weight diol (prepared by reacting adipic acid, ethylene glycol and 1,4-butane diol), and ii) blending 4800 parts of the resultant product with 1200 parts of a polymethylenepoly(phenyl isocyanate) having an NCO content of about 33%, with a 19% by weight 2,4'-isomer content and an isocyanate functionality of about 2.4.

RIM plaques were prepared using a laboratory piston metering unit and clamping unit. The metering unit was a two component instrument having a maximum metering capacity of 0.6 liters. A rectangular mold, 300 mm × 200 mm × 4 mm, was used to mold the samples. The mold was first stripping with a mold cleaner (N-methyl pyrrolidinone), then soaped (with Chemtrend 2006, available from Chemtrend) and then buffed twice. An aluminum transducer plate (2.2 inch radius) was connected to a force transducer mounted in the lid of the mold. The plate was soaked in DMF for an hour, polished with fine steel wool, rinsed with water and then rinsed with acetone. A RIM shot was then made, and at the demold time of 45 seconds, the lid of the mold was slowly opened. The maximum force required to pull the transducer plate from the molded plaque is the release force. The lower the number, the easier the release.

The following molding conditions were used:
Mold Temperature: 65° C.
Component B temp: 45° C.
Component A temp: 45° C.

Two different formulations were used. 3 parts by weight of internal release agent ("IMR") were tested in the following formulation:
Component B:
  POLYAMINE A: 33.6
  POLYAMINE B: 33.6
  DETDA: 26.0
  L-5304: 0.8
  IMR: 3.0
Component A: ISO: 77.3

4 parts by weight of internal release agent ("IMR") were tested in the following formulation:
Component B:
  POLYAMINE A: 33.1
  POLYAMINE B: 33.1
  DETDA: 26.0
  L-5304: 0.8
  IMR: 4.0
Component A: ISO: 77.1

The results were as follows, with the release force reported in pounds per square inch:

| Amount of IMR | IMR 1 | IMR 2 | EXAMPLE 4 FROM '527 PAT |
| --- | --- | --- | --- |
| 3 parts | 38.9 | 35 | 24.2 |
| 4 parts | 40.5 | 36 | 26.3 |

Neither IMR 3 nor the IMR from Example 4 of the '527 patent (U.S. Pat. No. 3,925,527) were compatible with the B-side and had to be blended with the isocyanate. The system using IMR 3 would not release.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An internal release composition comprising the reaction product of
   a) the transesterification product of
      1) a polyester (i) having an OH number of from about 50 to about 550, (ii) having an acid number of 4 or less, and (iii) prepared by reacting a polymerized fatty acid with a diol selected from the group consisting of neopentyl glycol and 2,2,4-trimethyl-1,3-pentane diol, and
      2) a lower alkyl acetoacetate, and
   b) an aliphatic monoisocyanate containing five or more carbon atoms exclusive of the isocyanate group, at an isocyanate to acetoacetate group equivalent ratio of from 1:1 to 1:10.

2. The composition of claim 1, wherein said OH number is from 50 to 300 and said acid number is 2 or less.

3. The composition of claim 2, wherein said OH number is from 100 to 200 and said acid number is less than 1.

4. An isocyanate reactive composition comprising:
   i) at least one isocyanate reactive compound having a molecular weight of from 400 to 10,000 and containing at least two isocyanate reactive groups, and
   ii) from about 2 to about 20% by weight based upon the weight of all the isocyanate reactive compounds of the reaction product of
      a) the transesterification product of
         1) a polyester (i) having an OH number of from about 50 to about 550, (ii) having an acid number of 4 or less, and (iii) prepared by reacting a polymerized fatty acid with a diol selected from the group consisting of neopentyl glycol and 2,2,4-trimethyl-1,3-pentane diol, and
         2) a lower alkyl acetoacetate, and
      b) an aliphatic monoisocyanate containing five or more carbon atoms exclusive of the isocyanate group, at an isocyanate to acetoacetate group equivalent ratio of from 1:1 to 1:10

5. The composition of claim 4 further containing at least one isocyanate reactive compound having a molecular weight of from 62 to 399 and containing at least two isocyanate reactive groups.

6. The composition of claim 5, wherein said reaction product is present in an amount of from 3 to 10% by weight.

7. In the process for the preparation of a molded polyurethane and/or polyurea elastomer by injecting a mixture of an isocyanate and an isocyanate reactive composition into a closed mold via the RIM technique, the improvement wherein said mixture contains from about 2 to bout 20% by weight based upon the weight of all the isocyanate reactive compounds of the reaction product of
   a) the transesterification product of
      1) a polyester (i) having an OH number of from about 50 to about 550, (ii) having an acid number of 4 or less, and (iii) prepared by reacting a polymerized fatty acid with a diol selected from the group consisting of neopentyl glycol and 2,2,4-trimethyl-1,3-pentane diol, and
      2) a lower alkyl acetoacetate, and
   b) an aliphatic monoisocyanate containing five or more carbon atoms exclusive of the isocyanate group, at an isocyanate to acetoacetate group equivalent ratio of from 1:1 to 1:10.

* * * * *